United States Patent [19]
Lee

[11] Patent Number: 6,148,891
[45] Date of Patent: Nov. 21, 2000

[54] CD LABELING DEVICE

[75] Inventor: Shun-Yi Lee, Chungho, Taiwan

[73] Assignee: Boma Technology Co., Ltd., Taipei, Taiwan

[21] Appl. No.: 09/114,812

[22] Filed: Jul. 13, 1998

[51] Int. Cl.[7] .................................................. B32B 31/00
[52] U.S. Cl. ......................... 156/391; 156/556; 156/579; 156/DIG. 24
[58] Field of Search ..................................... 156/556, 538, 156/391, 380, 293, DIG. 24, 579

[56] References Cited

U.S. PATENT DOCUMENTS 5,783,031  7/1998  Sievers ..................................... 156/556
5,951,819  9/1999  Hummell et al. ......................... 156/556

*Primary Examiner*—Richard Crispino
*Assistant Examiner*—Sue A. Purvis
*Attorney, Agent, or Firm*—Dorsey & Whitney LLP

[57] ABSTRACT

A CD labeling device has a base, a support detachably connected with the base and a planar disc detachably and slidably connected with the support and having a cushion securely attached on a face thereof. The CD labeling device is able to provide a smooth attachment of a label to a face of the CD to be labeled via the help of the cushion and the smooth sliding movement of the planar disc about the support.

13 Claims, 5 Drawing Sheets

CD LABELING DEVICE

BACKGROUND OF THE INVENTION

1. Field of the Invention

The present invention relates to a CD labeling device, and more particularly to a CD labeling device having a base, a support detachably connected with the base and a planar disc slidably movable along the support. The CD labeling device is able to smoothly and readily attach a label onto a face of a CD via application of a force to the labels located on the planar disc. Because the planar disc is able to slide along the support, the labels located between the support and the planar disc will also be pushed toward the CD to be labeled. Furthermore, a cushion is securely attached on a face of the planar disc, such that the labels are able to be smoothly attached to the face of the CD while the planar disc is slidably moved along the support.

2. Background

Due to the popularity of compact discs (CDs), whether writeable or read only, users find that they have more and more CDs day after day. Therefore, management of the CDs becomes a difficult job, especially to those readable ones. Since the information stored is able to be read from and written to the CDs, users will have to memorize the content being stored. To solve the memorization problem caused by the proliferation of CDs, labeling seems to be the best solution. A conventional labeling device is seen in U.K. Patent No. GB 2 305907. The patent relates to a device for applying or adhering two substantially planar discs each having a central aperture so that they are concentrically aligned to a device for centring and applying labels to compact discs. Another related patent is seen in T.W. Publication No. 324372. The patent is similar in structure to the U.K. patent. However, the T.W. patent has a planar disc urged by a spring and is movably mounted onto a base with a cap detachably mounted on the base in a way such that a CD mounted on the base is able to be labeled by pushing the cap downward to force the CD toward the planar disc. The CD later will be pushed upward for easy access of a user by the spring. As people skilled in the art will appreciate that the known structure of the above mentioned patents need combination of too many components, which increases the cost of manufacture and difficulties with maintenance of the same.

Furthermore, the planar disc is made of a hard material which is not capable of adhering or applying a label onto the CD and often causes wrinkles on the label.

The present invention provides an improved labeling device to obviate and/or mitigate the aforementioned problems.

SUMMARY OF THE INVENTION

The primary object of the invention is to provide an improved labeling device having a base having an indentation and a plurality of through holes defined in a periphery defining the indentation, a support having a plurality of legs extending therefrom and each corresponding to one of the through holes of the base and a planar disc slidably movable about the support. Due to a provision of a plurality of slots defined in an outer periphery of the support and a plurality of protrusions formed in a face defining a central through hole in the planar disc and each corresponding to one of the slots of the support, the labeling device of the invention is able to smoothly adhere a label onto a face of a CD by the movement of the planar disc about the support.

Another object of the invention is to provide an alternative connection between the planar disc and the base, such that the planar disc can be securely mounted onto the base to prevent separation therebetween, when the device is not in use.

Still another objective of the invention is to provide a cushion onto the face of the planar disc to readily facilitate a label on the CD smoothly.

Other novel features and advantages of the invention will become more apparent from the following detailed description when taken in conjunction with the accompanying drawings.

DETAILED DESCRIPTION OF THE PREFERRED EMBODIMENT

Figure 1:
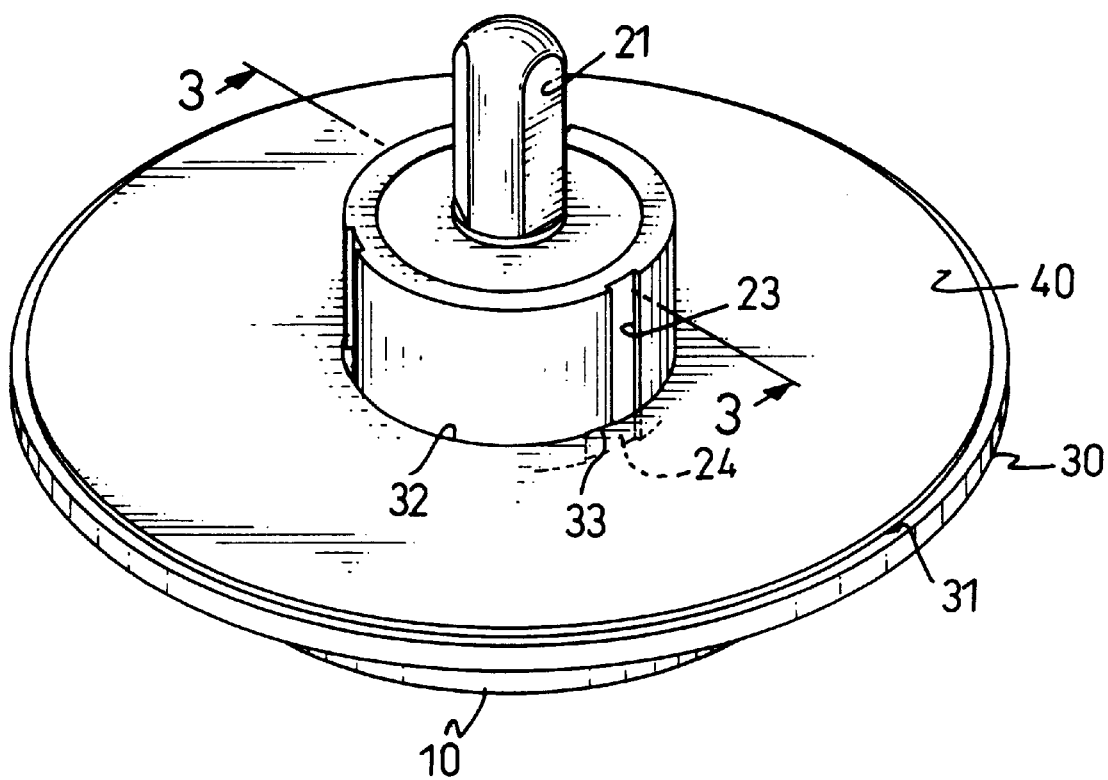
FIG. 1 is a perspective view showing a CD labeling device constructed in accordance with the invention.
Figure 2:
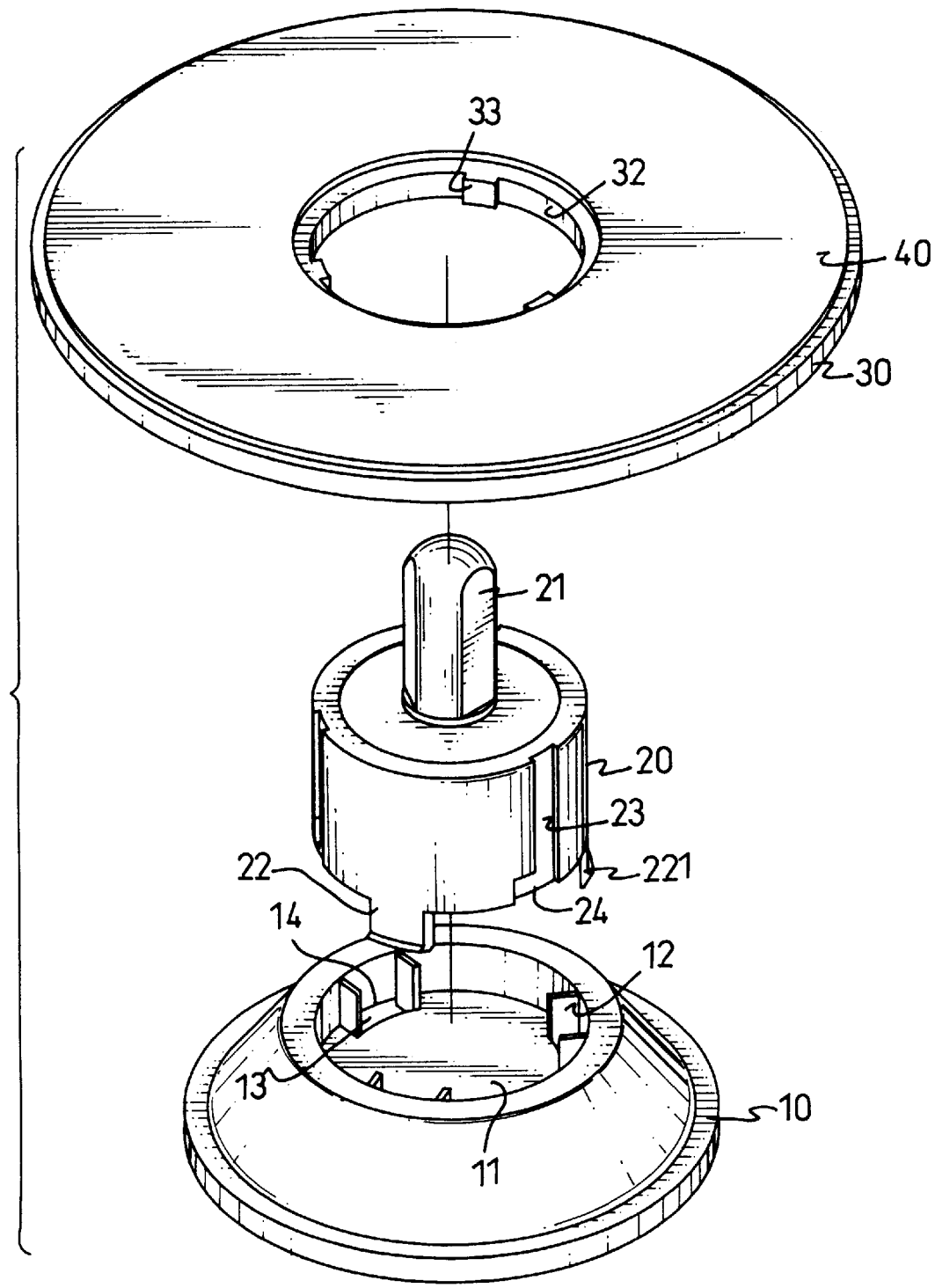
FIG. 2 illustrates an exploded view of the labeling device shown in FIG. 1.

Referring to FIGS. 1 and 2, an improved labeling device of the invention comprises a base (10) having an indentation (11) and a plurality of through holes (13) defined in a periphery defining the indentation (11), a support (20) having a central extension (21) extending out in a first direction therefrom and a plurality of legs (22) extending therefrom in a second direction which is opposite to the first direction and each corresponding to one of the through holes (13) of the base (10) and a planar disc (30) slidably movable about the support (20) and having a cushion (40) securely attached thereon. Each one of the through holes (13) have a pair of guiding plates (12) securely spaced apart from each other in a way that each one of the legs (22) is able to be directed into one of the corresponding through holes (13). Furthermore, a distal end of each one of the legs (22) have a wedge (221) integrally formed therewith and each one of the wedges (221) are able to clamp an edge (14) of the through holes (13). A plurality of slots (23) are axially defined in an outer periphery of the support (20) and a central through hole (32) is defined in the planar disc (30). An inner diameter of the central through hole (32) is slightly larger than an outer diameter of the support (20) so that the planar disc (30) is able to slide about the support (20) by inserting the support (20) into the central through hole (32) of the planar disc (30) However, to ensure a smooth sliding movement of the planar disc (30) about the support (20), a plurality of protrusions (33) are formed in a face defining the central through hole (32) of the planar disc (30) and each one of the protrusions (33) correspond to one of the slots (23) of the support (20). Because a width of each one of the slots (23) is slightly larger II than a width of the corresponding one of the protrusions (33) of the planar disc (30), the support (20) is able to have a close connection via the engagement between the protrusions (33) and the corresponding slots (23) of the support (20). Due to the sliding movement of the planar disc (30) being restricted by the slots (23) and the protrusions (33), the sliding movement of the planar disc (30) about the support (20) is smooth. It is to be noted that a plurality of recesses (24) each corresponding to and communicating with one of the slots (23) of the support (20) are laterally defined in the periphery of the support (20) and each one of the recesses (24) have a height which is adapted to be at least equal to a height of each one of the protrusions (33). Therefore, the planar disc (30) is able to be positioned on the support (20) after the support (20) is inserted into the central through hole (32) of the planar disc (30) and is rotated by an angle to have each one of the protrusions (33) to be received in the corresponding one of the recesses (24).

Figure 3:
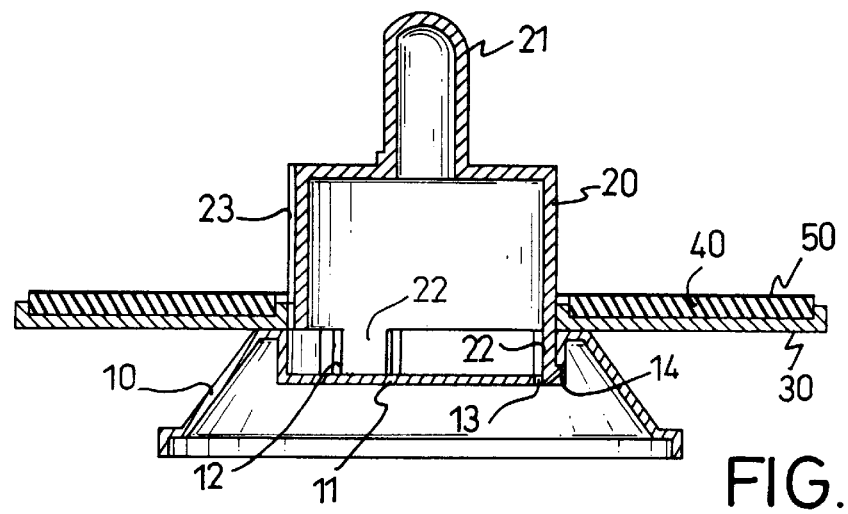
FIG. 3 is a cross sectional view taken from line 3—3 of FIG. 1.

It is to be noted from FIG. 3 that when the labeling device of the invention is in use, the support (20) is securely placed on the base (10) and the legs (22) of the support (20) are respectively inserted into one of the corresponding through holes (13) by the guidance of the guiding plates (12). Meantime, due to the provision of the wedges (221) with each one of the legs (22), the support (20) is able to be securely connected with the base (10) via the engagement of the wedges (221) with the corresponding one of the edges (14) defining each one of the through holes (13). Then, a user is able to place the planar disc (30) on the support (20) via inserting the protrusions (33) into the respective one of the corresponding slots (23) and rotated for an angle to allow the protrusions (33) to be received in the respective one of the corresponding recesses (24), which completes the assembly of the labeling device of the invention. After the planar disc (30) together with the cushion (40) thereon is securely connected with the support (20), the user is able to place a sheet of label (50) on the cushion (40).

Figure 4:
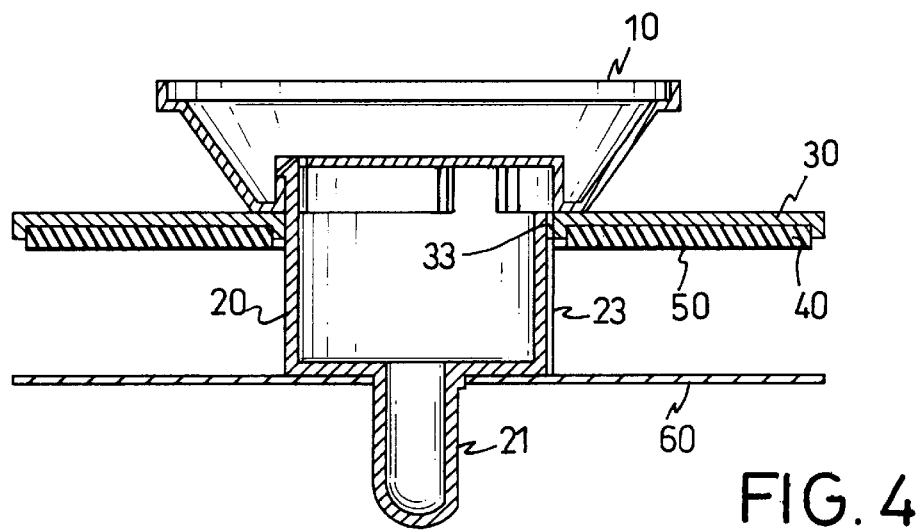
FIG. 4 is a schematic cross sectional view showing the operation of the labeling device to a CD.
Figure 5:
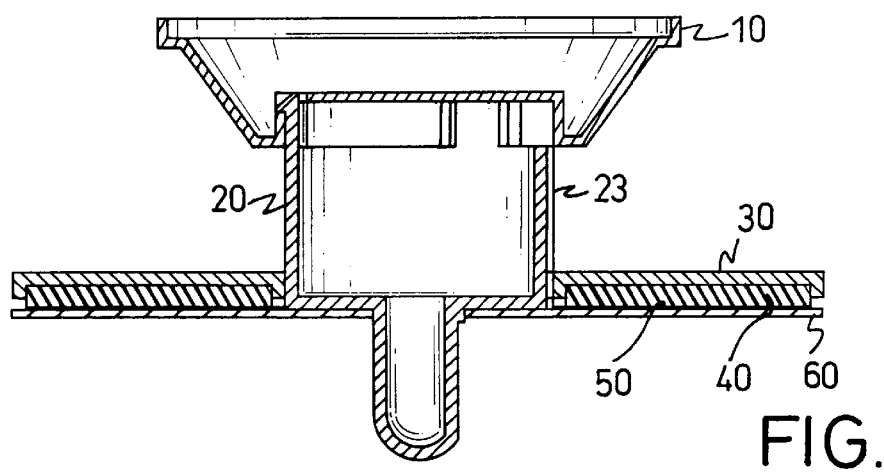
FIG. 5 is another schematic cross sectional view showing the adhering of a label to a face of the CD.

As shown in FIGS. 4 and 5, the extension (21) of the support (20) is inserted through the hole (not shown) of a CD (60) to be labeled and the labeling device of the invention is reversely placed while the user is still holding the extension (21) of the support (20) to prevent the CD (60) to be labeled from falling. Afterwards, the user releases the engagement between the protrusions (33) and the recesses (24), the planar disc (30) is then able to be slided along the extension (21) of the support (20) via the movement of the protrusions (33) in the slots (23). When the planar disc (30) together with the cushion (40) engages a face of the CD (60), the label (50) placed on the cushion (40) is able to be attached on the face of the CD (60). Due to the attachment of the label (50) onto the CD (60) being conventional in the art, detailed description thereof is omitted. Because of the provision of the cushion (40), the label (50) is able to be smoothly attached on the face of the CD (60).

Figure 6:
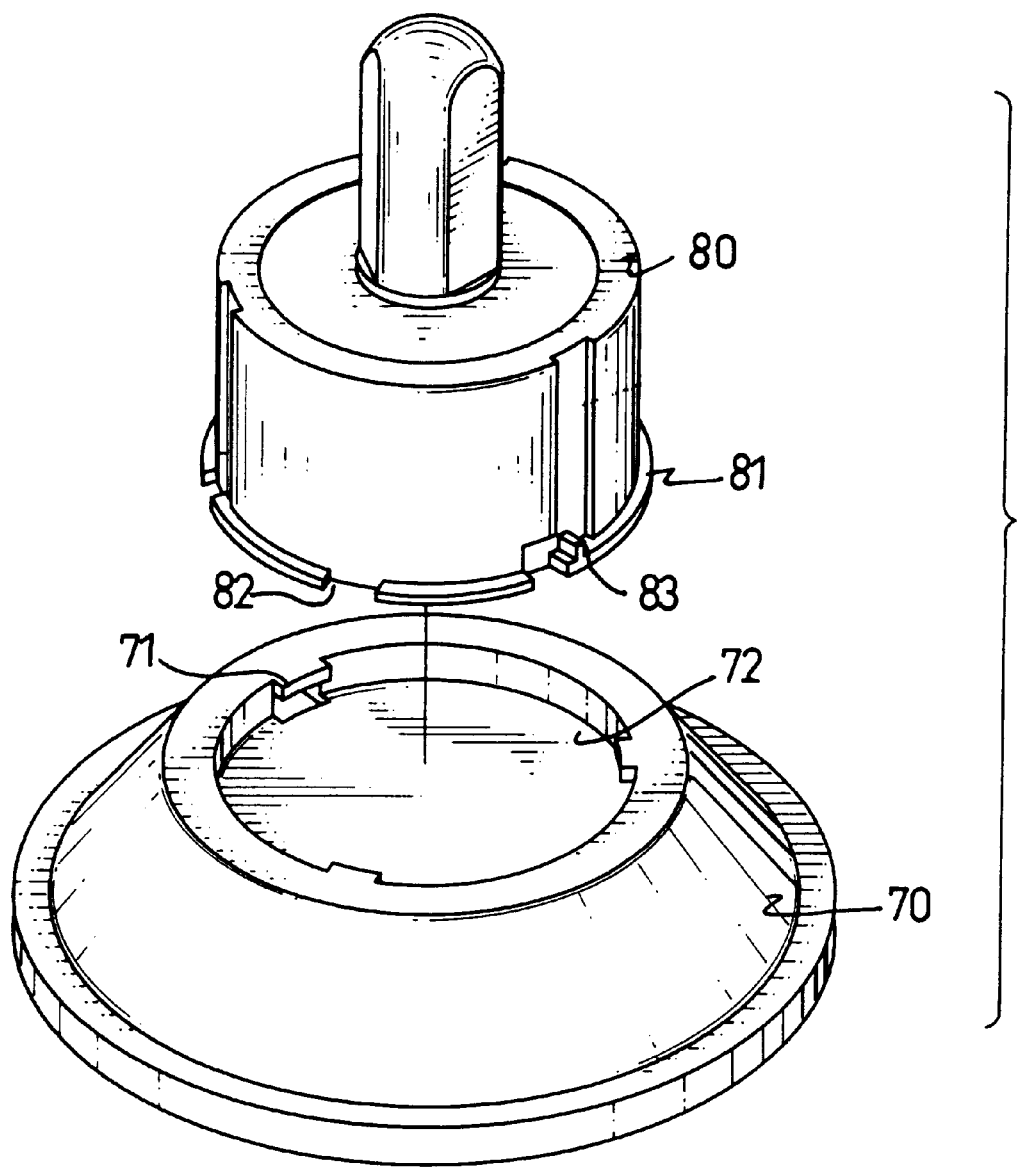
FIG. 6 is a partially exploded view of the labeling device of another preferred embodiment of the invention.
Figure 7:
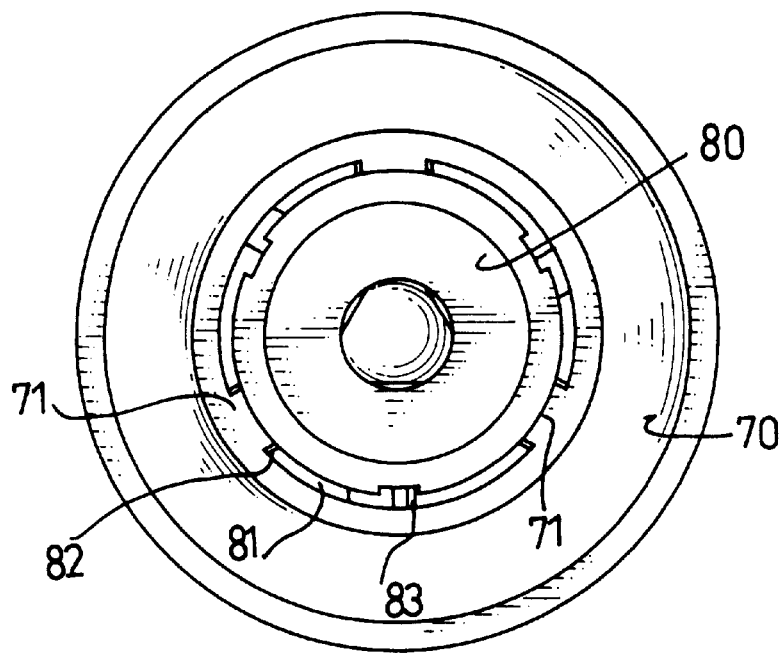
FIG. 7 is a plan view showing a construction of the labeling device of FIG. 6.
Figure 8:
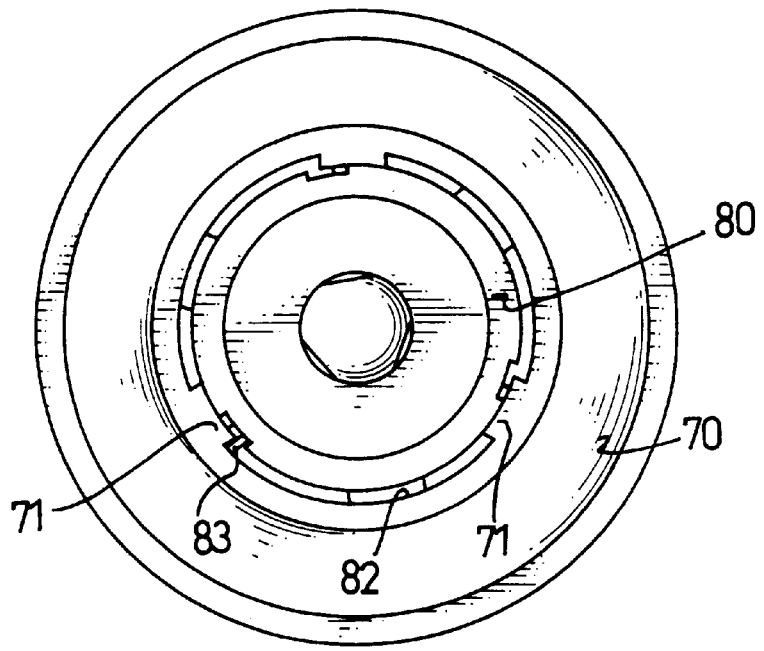
FIG. 8 is a plan view showing an engagement between a support and a base of the labeling device of FIG. 6.

Referring to FIGS. 6, 7 and 8, another preferred embodiment of the invention is shown, wherein similar components have the same reference numeral and other components have different reference numeral to be able to distinguish from the first embodiment of the invention. The support (80) has a flange (81) integrally formed on an edge thereof and a plurality of cutouts (82) defined in a face of the flange (81). A stop (83) is formed in a face defining one of the cutouts (82). The base (70) has an indentation (72) defined therein and a wing (71) formed on a top face defining the indentation (72) and corresponding to one of the cutouts (82). Furthermore, the wing (71) is flush with the top face of the indentation (72). A diameter of the flange (81) is slightly smaller than a diameter of the indentation (72) and a height between a bottom face and the top face defining the indentation (72) is slightly larger than a thickness of the flange (81), and a width of the cutout (82) is slightly larger than a width of the wing (71), such that the support (80) is able to be securely received within the indentation (72) via inserting the wing (71) into a corresponding one of the cutouts (82) and rotating the support (80) for an angle to allow the flange (81) of the support (80) to be securely clamped between the wing (71) and the bottom face of the indentation (72). The stop (83) functions to prevent a release of engagement between the wing (71) and the flange (81) by abutting an end of one of the flanges (81). Therefore, the support (80) is able to be securely connected with the base (70).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A CD labeling device comprising:

a base having an indentation defined therein and a plurality of through holes defined in a bottom face defining the indentation;

a support adapted to be detachably received within the indentation and having an extension extending out therefrom and a plurality of axial slots which are peripherally defined in an outer face thereof; and a planar disc detachably connected with and movably about the support and having a central through hole defined therein, a plurality of protrusions formed in a face defining the central through hole and each of which correspond to one of the slots of the support and a cushion securely attached on a planar face thereof.

2. The CD labeling device as claimed in claim 1, wherein the support has a plurality of legs adapted to be detachably received within one of the through holes.

3. The CD labeling device as claimed in claim 2, wherein each one of the legs have a wedge integrally formed therewith.

4. The CD labeling device as claimed in claim 2, wherein a width of the leg is slightly smaller than a width of the through hole of the base.

5. The CD labeling device as claimed in claim 1, wherein the support has a plurality of recesses laterally defined and each one of which communicate with one of the slots.

6. The CD labeling device as claimed in claim 1, wherein the base further has a pair of guiding plates provided for each one of the through holes thereof.

7. The CD labeling device as claimed in claim 1, wherein a diameter of the central through hole of the planar disc is slightly larger than a diameter of the support.

8. The CD labeling device as claimed in claim 1, wherein the diameter of the support is slightly smaller than a diameter of the indentation.

9. A CD labeling device comprising:

a base having an indentation defined therein and a plurality of wings formed with a top face defining the indentation;

a support adapted to be detachably received within the indentation and having an extension extending out therefrom and a plurality of axial slots which are peripherally defined in an outer face thereof, and a planar disc detachably connected with and movably about the support and having a central through hole defined therein, a plurality of protrusions formed in a face defining the central through hole and each of which correspond to one of the slots of the support and a cushion securely attached on a planar face thereof.

10. The CD labeling device as claimed in claim 9, wherein the support has a flange integrally formed therewith and a plurality of cutouts respectively defined to correspond to one of the wings.

11. The CD labeling device as claimed in claim 9, wherein the support further has a stop formed to be detachably abut one of the wings of the base.

12. The CD labeling device as claimed in claim 9, wherein a width of each one of the cutouts is slightly larger than a width of each one of the wings.

13. The CD labeling device as claimed in claim 9, wherein the flange is adapted to be selectively received within the indentation and abutted by the wings.

* * * * *